(12) United States Patent
Szydlowski et al.

(10) Patent No.: US 11,053,846 B2
(45) Date of Patent: Jul. 6, 2021

(54) INTERMEDIATE HOUSING HUB COMPRISING DISCHARGE FLOW GUIDING CHANNELS FORMED BY THE DISCHARGE FINS

(71) Applicant: SAFRAN AIRCRAFT ENGINES, Paris (FR)

(72) Inventors: Julien Antoine Henri Jean Szydlowski, Moissy-Cramayel (FR); Romain Nicolas Lagarde, Moissy-Cramayel (FR); Ghislain Maxime Romuald Madiot, Moissy-Cramayel (FR); Benjamin Lukowski, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 113 days.

(21) Appl. No.: 16/474,972

(22) PCT Filed: Dec. 28, 2017

(86) PCT No.: PCT/FR2017/053862
§ 371 (c)(1),
(2) Date: Jun. 28, 2019

(87) PCT Pub. No.: WO2018/122538
PCT Pub. Date: Jul. 5, 2018

(65) Prior Publication Data
US 2019/0345875 A1 Nov. 14, 2019

(30) Foreign Application Priority Data
Dec. 30, 2016 (FR) ...................................... 1663562

(51) Int. Cl.
*F02C 6/08* (2006.01)
*F01D 17/10* (2006.01)
*F04D 27/02* (2006.01)

(52) U.S. Cl.
CPC .............. *F02C 6/08* (2013.01); *F01D 17/105* (2013.01); *F04D 27/023* (2013.01); *F05D 2240/129* (2013.01); *F05D 2270/101* (2013.01)

(58) Field of Classification Search
CPC ...... F01D 17/105; F04D 27/009; F04D 27/02; F04D 27/0207; F04D 27/0215;
(Continued)

(56) References Cited

U.S. PATENT DOCUMENTS

2009/0301102 A1* 12/2009 Clemen ................. F04D 29/541
60/785
2010/0158684 A1* 6/2010 Baralon ................. F01D 9/065
415/208.1
(Continued)

FOREIGN PATENT DOCUMENTS

| EP | 3040549 A1 | 7/2016 |
| FR | 3002296 A1 | 8/2014 |
| WO | 2006/091142 A1 | 8/2006 |

OTHER PUBLICATIONS

International Preliminary Report on Patentability received for PCT Patent Application No. PCT/FR2017/053862, dated Jul. 11, 2019, 17 pages (9 pages of English Translation and 8 pages of Original Document).
(Continued)

*Primary Examiner* — Christopher Verdier
*Assistant Examiner* — Elton K Wong
(74) *Attorney, Agent, or Firm* — Womble Bond Dickinson (US) LLP (57) ABSTRACT

The invention relates to an intermediate housing hub (2) comprising a discharge stream conduit (18) having a given
(Continued)

length (L1), and discharge fins (22) extending in the discharge stream conduit (18) and having a given chord length (L2), the chord length (L2) of at least one of the discharge fins (22) being at least equal to 50% of the length of conduit (L1).

16 Claims, 5 Drawing Sheets

(58) Field of Classification Search
CPC ........ F04D 27/023; F04D 29/682; F02C 6/08; F02C 7/18; F02K 3/075; F05D 2240/129; F05D 2270/101
See application file for complete search history.

(56) References Cited

U.S. PATENT DOCUMENTS

| | | | |
|---|---|---|---|
| 2014/0075956 A1* | 3/2014 | Patsouris | F01D 17/105 60/785 |
| 2014/0234080 A1 | 8/2014 | Mojem et al. | |
| 2015/0275757 A1* | 10/2015 | Turner | F02C 7/04 415/1 |

OTHER PUBLICATIONS

International Search Report and Written Opinion received for PCT Patent Application No. PCT/FR2017/053862, dated Apr. 17, 2018, 20 pages (9 pages of English Translation and 11 pages of Original Document).

Preliminary Research Report received for French Application No. 1663562, dated Nov. 6, 2017, 2 pages (1 page of French Translation Cover Sheet and 1 page of original document).

* cited by examiner

INTERMEDIATE HOUSING HUB COMPRISING DISCHARGE FLOW GUIDING CHANNELS FORMED BY THE DISCHARGE FINS

FIELD OF THE INVENTION

The invention relates to the general field of double flow turbomachines, and more particularly discharge valves allowing the regulation of the air at the outlet of a compressor of a turbomachine of this type, said valves sometimes being designated by their acronym VBV (for Variable Bleed Valves).

TECHNICAL BACKGROUND

A double flow turbomachine generally comprises, from upstream to downstream in the gas outflow direction, a fan, a primary outflow annular volume and a secondary outflow annular volume. The mass of air aspired by the fan is therefore divided into a primary flow F1, which circulates in the primary outflow stream 10, and a secondary flow F2, which is concentric with the primary flow F1 and circulates in the primary outflow stream 14.

The primary outflow stream 10 passes through a primary body comprising one or more compressor stages, for example a low-pressure compressor and a high-pressure compressor, a combustion chamber, one or more turbine stages, for example a high-pressure turbine and a low-pressure turbine, and a gas exhaust nozzle.

In a manner known per se, the turbomachine also comprises an intermediate housing, the hub of which is disposed between the low-pressure compressor housing (or booster) and the high-pressure compressor housing. The intermediate housing comprises discharge valves or VBV, the role of which is to regulate the flow rate at the inlet of the high-pressure compressor so as in particular to limit the risk of surging in the low-pressure compressor by removing a portion of the air outside the primary outflow volume 10.

Figure 1:
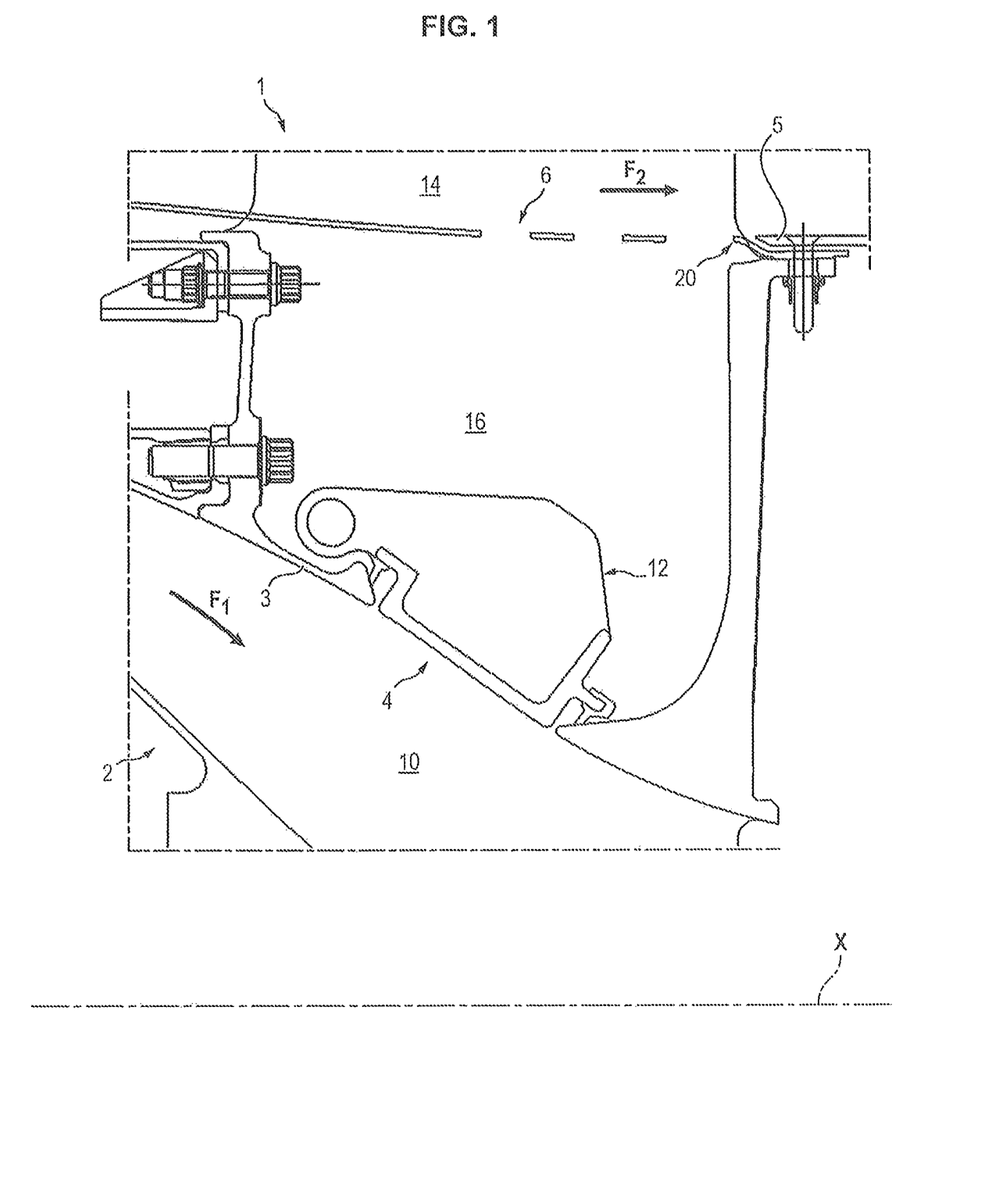
FIG. 1, which was describe above, is a schematic representation in axial section of an intermediate housing hub known from the prior art.

As illustrated in FIG. 1, which is a partial axial section view of a double body, double flow aircraft turbojet of a known type, the hubs 2 of the intermediate housings 1 generally comprise two interconnected coaxial annular shroud rings, respectively inner 3 and outer 5.

The inner shroud ring 3 delimits the annular primary outflow stream 10 of the primary outflow F1 of the turbomachine and includes bleed openings 4 which are distributed circumferentially around the axis X of the inner shroud ring 3 (which is coaxial with the hub 2). One opening 4 of this type is conventionally blocked by a corresponding discharge valve 12 intended to regulate the flow rate of the high-pressure compressor. A discharge valve 12 of this type can in particular comprise a door which is mounted pivoting on the inner shroud ring 3.

For its part, the outer shroud ring 5 delimits the primary outflow stream 14 of the primary outflow F2 of the turbomachine. It comprises in its downstream portion one or more discharge holes 6, also distributed circumferentially around the axis X.

When the flow rate of air allowed to enter the high-pressure compressor is reduced, a surplus of air in the primary outflow stream 14 can then be discharged into the inter-stream volume 16. This avoids allowing the surging phenomena which can lead to deterioration or even complete destruction of the low-pressure compressor to occur.

When, on the contrary, the high-pressure compressor is under excess pressure, the openings 4 and their doors 12, the inter-stream volume 16 and the holes 6 allow the discharge of air from the primary outflow stream 10 to the primary outflow stream 14 of the turbomachine.

In particular, when a discharge valve 12 is opened a flow of air is scooped into the flow F1 of the primary outflow 10. This flow of scooped air passes through the inter-stream volume 16 and is discharged into the outflow stream 14 by the holes 6.

Typically, these holes 6 are equipped with gratings 20 intended to direct the flow of air at the outlet of the inter-stream zone 16.

Modern turbomachines operate at ever-greater bypass ratios. In order to limit losses due to shocks in supersonic flows at the fan head, the angular speed of rotation of the fan is reduced. This has the effect of reducing the compression ratio of the fan. At smaller compression ratios, the head and separation losses of the secondary flow F2 therefore have a greater impact and must limited to the maximum extent. These head losses are present in particular in zones having surface irregularities.

Moreover, the architectures of current turbomachines tend to limit the volume available between the main stream and the secondary stream so as to achieve high bypass ratios. Thus, they do not allow correct orientation of the discharge flow prior to its injection into the secondary stream.

SUMMARY OF THE INVENTION

One objective of the invention is therefore to propose a double flow turbomachine comprising discharge valves, allowing a reduction in head losses and risks of separation of the secondary flow in the secondary stream so as to increase the operability of the turbomachine, that is simple and easy to implement, without however increasing the mass of the turbomachine.

To this end, the invention proposes an intermediate housing hub for a double flow turbomachine, said hub comprising:
- an inner shroud ring configured to delimit a primary outflow stream of the primary gas flow of the turbomachine,
- an outer shroud ring configured to delimit a secondary outflow stream of the secondary gas flow of said turbomachine,
- an inter-stream volume,
- at least one discharge valve for bypassing a portion of the primary flow into the inter-stream volume,
- at least one discharge leading from the outer shroud ring into the secondary outflow stream, The discharge comprises a discharge sleeve and one or more discharge fins which extend within said sleeve, the fins and walls of the sleeve defining together several redirecting ducts designed to discharge the flow of gas from the inter-stream volume by redirecting it into the secondary outflow stream, the chord length of at least one of the fins being greater than 50%, preferably 75% of a duct length of the sleeve.

According to a second aspect, the invention also proposes an intermediate housing comprising a hub of this type and a turbomachine comprising an intermediate housing of this type.

BRIEF DESCRIPTION OF THE DRAWINGS

Other features, aims and advantages of the present invention will appear more clearly upon reading the detailed description which follows, and with reference to the appended drawings, given by way of non-limiting examples and in which.

DETAILED DESCRIPTION OF ONE EMBODIMENT

Figure 2:
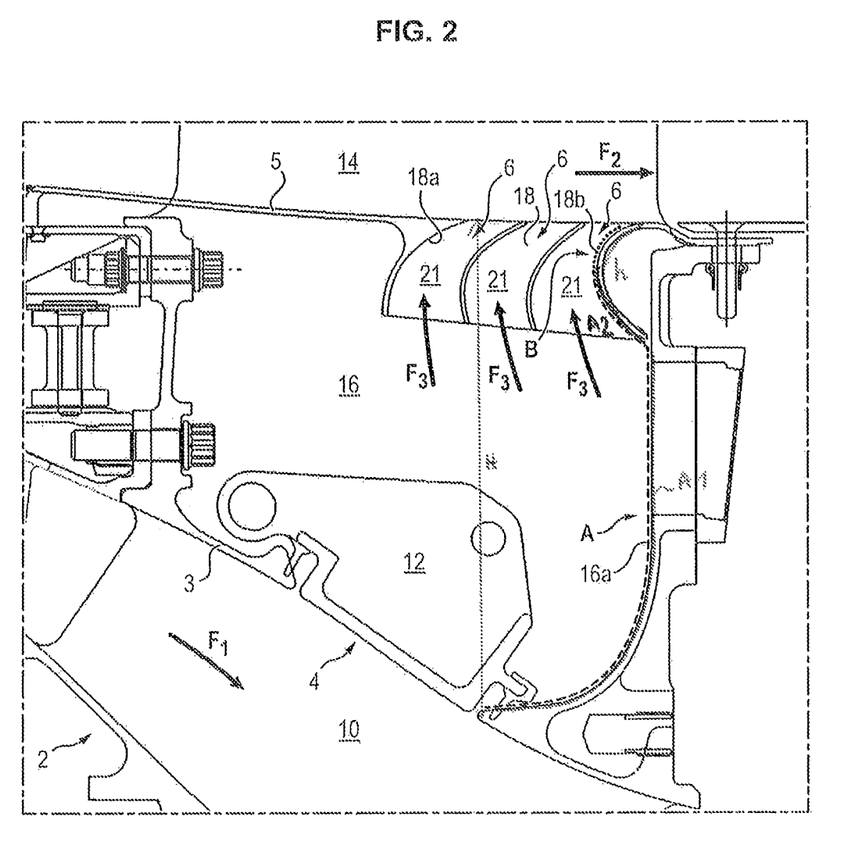
FIG. 2 is a section view illustrating a possible embodiment of the invention.
Figure 3:
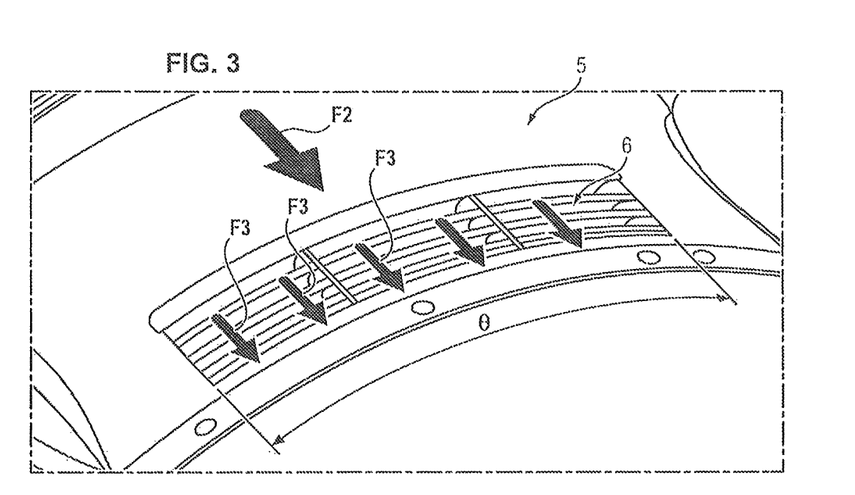
FIG. 3 illustrates, in top view, the orientation at the secondary outflow stream of the fins of a discharge hole of an intermediate housing hub conforming to the invention.

In the following, an intermediate housing hub for a double flow turbomachine and an associated intermediate housing will now be described with reference to FIG. 2 and the following figures.

The parts of the intermediate housing hub 2 of the prior art, already described, are also present in the embodiments that follow. For these parts, the numerical symbols that designate them in FIG. 1 have been re-used.

In particular, as in the case of the hub illustrated in FIG. 1, an intermediate housing hub 2 conforming to the invention comprises:
- an inner shroud ring 3 configured to delimit externally a primary outflow stream 10 of the primary gas flow F1 of the turbomachine,
- an outer shroud ring 5 configured to delimit internally an outflow stream 14 of the secondary gas flow F2 of said turbomachine, and
- an inter-stream volume 16 which comprises one or more discharges 6 which lead into the outer shroud ring 5.

The intake opening 4, which is formed in the inner shroud ring 3 of the hub 2, can be selectively opened or closed by a door 12 depending on the phases of flight of the turbomachine. Preferably, the door 12 is movable between a closed position, in which the door 12 closes the intake opening 4, and an open position, in which the door 12 frees the intake opening 4. For example, the door 12 can be mounted articulated on the inner shroud ring 3 or comprise a sliding trap door. The door 12 can in particular be housed in the inter-stream volume 16 in its closed position.

A discharge 6 comprises:
- a sleeve 18 which extend in the interior of the inter-stream volume 16 and the interior walls of which, upstream and downstream 18a, 18b are profiled with a certain curvature;
- a plurality of discharge fins 22 which extend in the interior of the sleeve 18 and define with said sleeve 18 a plurality of air ducts 21 which ensure the evacuation of air passing through the inter-stream volume 16 and its redirection into the secondary flow 14.

The sleeve 18 leads into the secondary outflow space 14 at the outlet opening formed in the inner shroud ring 5 for the discharge 6. It has an inlet opening 19 in fluid communication with the inter-stream volume 16 and the primary outflow stream 10 when the door 12 is open. It also has a duct length L1 corresponding to a minimum distance between the inlet opening 19 and the outlet opening at the inner shroud ring 5 (discharge 6).

These fins 22 are thus configured to orient a flow of discharge air F3 coming from the primary outflow stream 10 and inject it into the secondary outflow stream 14 in a direction substantially parallel to that of the secondary flow F2, so as to reduce head losses in the secondary outflow stream 14. Provided advantageously for example are from 1 to 4 discharge fins 22 in a sleeve 18 (with 2 to 5 ducts 21).

Figure 6:
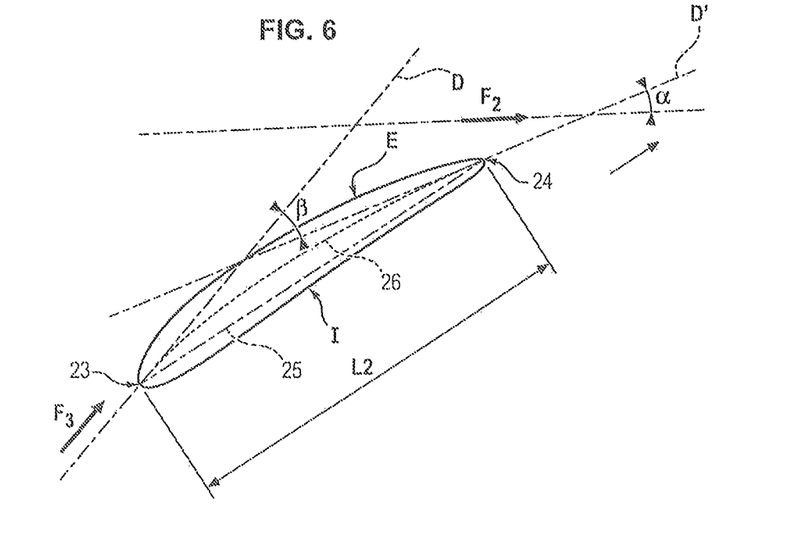
FIG. 6 illustrates schematically the profile of a fin and its characteristics.
Figure 7:
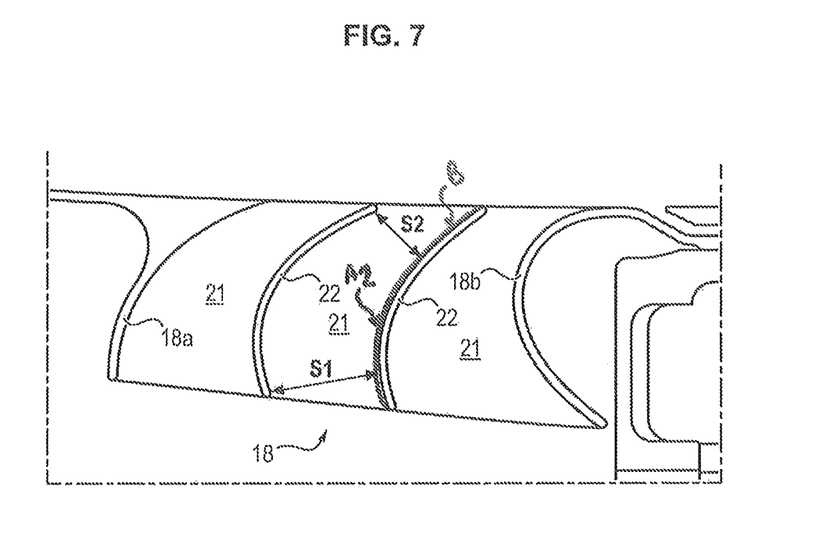
FIG. 7 illustrates an example of angular deviation of the fins of a discharge of an intermediate housing hub conforming to the invention.

This discharge fins 22 are profiled fins, each of them comprising a leading edge 23, a trailing edge 24, suction side E and pressure side I walls extending between the leading edge 23 and the trailing edge 24, a chord 25, a mean line 26 and a chord length L2 (FIG. 6).

Figure 5:
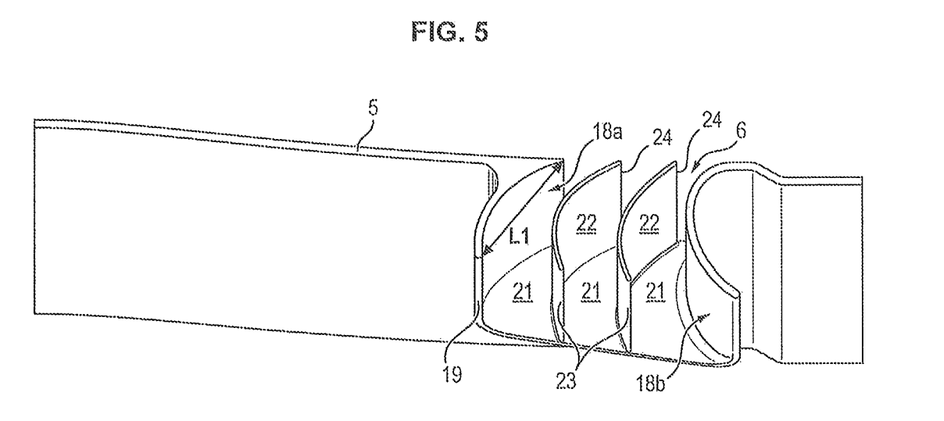
FIG. 5 is a perspective view of an exemplary embodiment of a duct of a discharge stream of an intermediate housing hub conforming to the invention.

Hereafter (see FIG. 5) the "profile" of a discharge fin 22 is understood to mean a transverse section of the discharge fine 22, that is a cross section of the discharge fin 22 along plane generally perpendicular to the suction side E and the pressure side I of the discharge fin 22, at the root of the discharge fin 22. The "chord" 25 of a discharge fin 22 is understood to mean the fictional straight line segment which has, at its ends, the leading edge 23 and the trailing edge 24 of the profile of the discharge fin 22. Moreover, the "chord length" L2 of a discharge fin 22 is understood to mean the distance between the leading edge 23 and the trailing edge 24 of the profile of the discharge fin 22, or in other words the chord length 25 of this discharge fin 22. Finally, the "mean line" 26 of a discharge fin 22 is understood to be the fictitious line which comprises all the points equidistant from the suction side E and the pressure side I of the profile of the discharge fine 22.

In order to reduce the head losses and the risks of separation of the secondary flow F2 and to increase the operability of the turbomachine, particularly when the duct length L1 is reduced due to the small volume available between the primary outflow stream 10 and the secondary outflow stream 14 (inter-stream volume 16), the chord length L2 of at least one of the discharge fins 22 is at least equal to 50% of the duct length L1.

In one embodiment, the chord length L2 of all the discharge fins 22 of the VBV grating is at least equal to 50% of the duct length L1.

Figure 4:
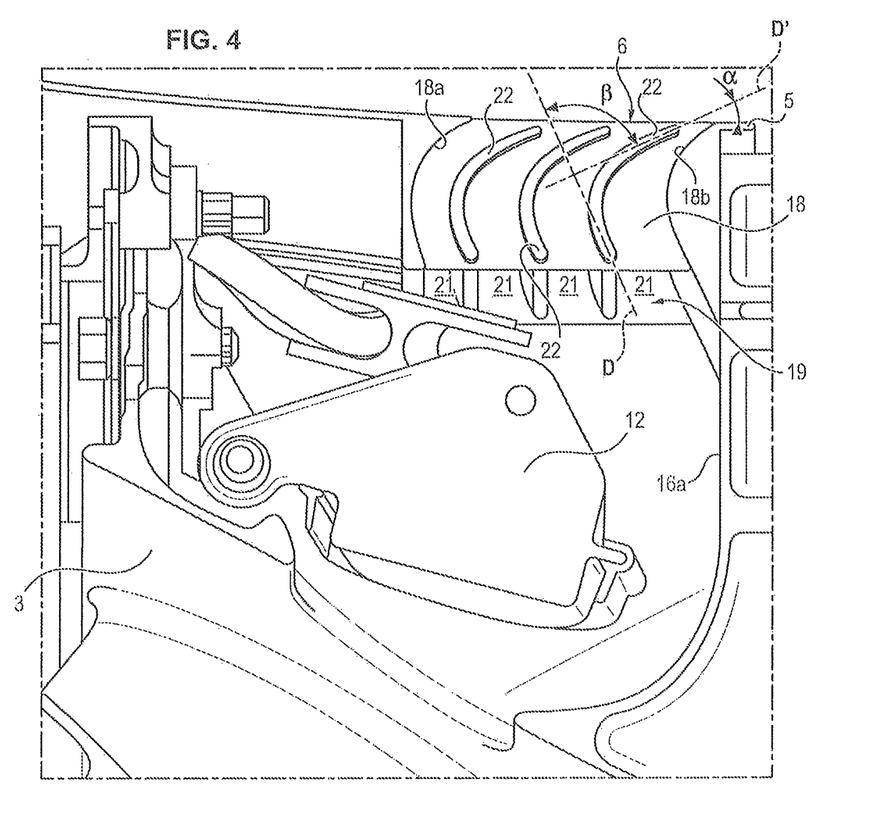
FIG. 4 is a partial perspective view of an exemplary embodiment of an intermediate housing hub conforming to the invention.

In this manner, the discharge fins 22 form, with the upstream wall 18a and the downstream wall 18b, guiding channels (see in particular FIG. 4 which illustrates four guiding channels) of the discharge flow F3 between the inter-stream volume 16 and the discharge opening 6 and allow continuous and progressive modification of the outflow direction of the discharge flow F3 and its redirection. During the injection of the discharge flow F3 into the secondary outflow stream 14 (i.e. at the outlet of the sleeve 18), the discharge flow F3 is then substantially aligned with the secondary flow F2 and has no tendency to form eddies downstream of the discharge 6, which reduced or even cancels aerodynamic losses.

In one embodiment, the chord length L2 of at least one of the discharge fins 22 (and preferably of all the discharge fins 22) is at least equal to 75% of the duct length L1, preferably at least equal to 85% of the duct length L1, for example between 95% and 110% of the duct length L1. In fact it will be noted that the discharge fins 22 can be flush with the inlet opening 19 and the outlet opening 6, in which case the chord length L2 of the discharge fins 22 can even be greater than the duct length L1 (see for example FIG. 5).

In order to capture a maximum of the discharge flow F3 in the sleeve 18, a ration between the cross sections $S_1$ and $S_2$ of the farthest downstream air duct 21 of the sleeve 18 is comprised between 1.5 and 3, preferably equal to approximately 2.5 (within 10%). By farthest downstream air duct 21 is meant here the portion of the sleeve 18 extending between the inlet opening 19 and the outlet opening 6 and delimited downstream by the downstream wall 18b and upstream by the discharge fin 22 closest to the downstream wall 18b. By cross section $S_1$ is meant here the farthest downstream surface of the air duct 21, said cross section $S_1$ extending in a plane normal to the pressure side wall I of the farthest downstream discharge fin of the sleeve 18, at the leading edge 23 of the farthest downstream discharge fin 22. By cross section $S_2$ is meant here the surface of the farthest downstream air duct 21, said cross section $S_2$ extending in a plane normal to the pressure side wall I of the farthest downstream discharge fin 22 of the sleeve, at the trailing edge 24 of the farthest downstream discharge fin 22.

The invention finds application particularly in the case of very compact engines, i.e. those in which the ratio h/H is at most equal to 0.5:

$$\frac{h}{H} \leq 0.5$$

Where: H is the distance along a radial axis between the inner shroud ring 3 and the outer shroud ring 5 of the intermediate housing hub, and h is the curvilinear length of the downstream inner wall 18b of the sleeve 18.

Optionally, each discharge fin 22 can be positioned in the discharge stream 18 duct so that the angle of incidence of the discharge flow F3 on the discharge fin 22 is substantially aligned with its camber at its leading edge 23 (F3 parallel to the straight line D tangent to the mean line 26 at the leading edge 23).

The inter-stream volume 16 comprises a bottom wall 16a, corresponding to the farthest downstream wall of the inter-stream volume and which extends between the inner shroud ring 3, at the intake opening, and the outer shroud ring at the discharge 6. The bottom wall 16a therefore comprises the downstream wall 18b of the sleeve 18. This bottom wall 16a is defined in two portions to ensure the redirection of the discharge flow. A first portion A (in dashed lines in FIG. 2), extending from the inner shroud ring 3 over a curvilinear length comprised between 75% and 90% of its total curvilinear length is configured to capture and accelerate the discharge flow F3. This first portion A comprises a portion of the downstream wall 18b of the sleeve 18. A second portion B (in dotted lines in FIG. 2), extending between the first portion and the discharge 6 radially redirects the flow to improve the transition with the secondary flow F2. This second portion B comprises the rest of the downstream wall 18b.

Moreover, the first portion of the bottom wall 16a comprises a first sub-portion A1, extending between the inner shroud ring 3 and the downstream wall 18b of the sleeve 18, and a second sub-portion A2 extending between the radially inner end of the downstream wall 18b of the sleeve 18 and the second portion B. The angle between the first sub-portion A1 and the second sub-portion A2 is comprised between 125° and 135°, so as to accelerate the gas flow F3 during its introduction into the sleeve 18. In other words, the portion A2 of the downstream wall 18b of the sleeve is configured to form an angle comprised between 35° and 45° with the revolution axis of the hub 2.

In addition, the deviation angle 3 (difference between the inlet angle and the outlet angle α defined by the slopes of the profile) of the flow F3 passing through the different ducts 21 defined by the fins 22 and the interior walls of the sleeve 18 is comprised between 70° and 90°, so that the connection between the first and the second portion is defined by an inversion of the deviation direction of the discharge flow. Preferably, the outlet of the second portion of the discharge fins 22 and of the downstream wall 18b (and if applicable of the upstream wall 18a) is tangent to the outer shroud ring. In other words, the straight line tangent to the camber of the discharge fins 22 at the trailing edge is substantially parallel to the outflow direction of the secondary flow F2. To this end, the camber of the trailing edge 24 and of the walls 18a and 18b must therefore be close to the direction of the outflow F2 so that the angle α between the direction of the outflow F2 and the tangent to the straight line D', which is parallel to the mean line at the trailing edge, is comprised between 5° and a maximum of 35°.

Finally, at least one of the discharge fins 22 has an azimuth range θ comprised between 30° and 50°, for example on the order of 40°, where the azimuth range corresponds to an angular portion of the discharge fin 22 which is seen by the secondary flow F2.

The invention claimed is:

1. An intermediate housing for a bypass gas turbine engine, the intermediate housing comprising:
   an inner shroud ring configured to delimit a primary outflow stream and an outer shroud ring configured to delimit a secondary outflow stream, wherein the inner shroud ring and the outer shroud ring together delimit a space; and
   a discharge duct comprising a sleeve and a fin,
      wherein the sleeve comprises an inlet extending within the space, an outlet which is flush with the outer shroud ring, and a predetermined length, wherein the predetermined length corresponds to a minimum distance between the inlet and the outlet,
      wherein the fin extends within said sleeve to the outlet of the sleeve,
      wherein the fin and the sleeve together define two ducts, each duct being configured to discharge a gas flow from the space into the secondary outflow stream, and
      wherein a chord length of the fin is greater than 50% of the predetermined length; and
   wherein a ratio h/H is at most equal to 0.5:

$$\frac{h}{H} \leq 0.5$$

where: H is a distance along an axis that is radial with respect to a revolution axis of the intermediate housing between the inner shroud ring and the outer shroud ring, and h is a curvilinear length of a downstream inner wall of the sleeve.

2. The intermediate housing of claim 1, wherein the discharge duct comprises at least one additional fin, a chord length of the fin and of the at least one additional fin being at least equal to 75% of the predetermined length.

3. The intermediate housing of claim 2, wherein the chord length of the fin and of the at least one additional fin is comprised between 75% and 110% of the predetermined length.

4. The intermediate housing hub of claim 1, further comprising a wall extending between the inner shroud ring and the outer shroud ring,
- wherein the wall has a first portion and a second portion;
- wherein the first portion and the second portion of the wall have a total curvilinear length total curvilinear length wherein the first portion of the wall comprises a portion of the downstream inner wall of the sleeve and extends from the inner shroud ring over a first curvilinear length comprised between 75% and 90% of the total curvilinear length; and
- wherein the second portion of the wall extends from the first portion of the wall to the outer shroud ring and is configured to redirect the gas flow to improve the transition with the secondary outflow steam.

5. The intermediate housing of claim 4, wherein the first portion of the wall comprises a first sub-portion, extending between the inner shroud ring and a radially inner end of the sleeve, and a second sub-portion extending between the radially inner end of the sleeve and the second portion, an angle between the first sub-portion and the second sub-portion being comprised between 125° and 135°, so as to accelerate the gas flow.

6. The intermediate housing of claim 1, wherein a first duct of the two ducts extends between the downstream inner wall of the sleeve and a pressure side wall of the fin, said first duct having a first area and a second area, wherein the first area corresponds to an area of the first duct in a plane normal to the pressure side wall at the inlet of the sleeve and the second area corresponds to an area of the first duct in a plane normal to said pressure side wall the outlet of the sleeve, a ratio between the first area and the second area being comprised between 1.5 and 3.

7. The intermediate housing of claim 6, wherein the ratio between the first area and the second area is equal to 2.5.

8. The intermediate housing of claim 1, wherein the sleeve has an upstream inner wall, the fin disposed between the upstream inner wall and the downstream inner wall.

9. The intermediate housing of claim 1, wherein the discharge duct comprises between 1 and 3 additional fins.

10. The intermediate housing of claim 1, wherein a camber of the fin at a leading edge of the fin is aligned with a direction of the gas flow at the leading edge of the fin.

11. The intermediate housing of claim 1, wherein a camber of the fin at a trailing edge of the fin forms an angle smaller than 35° with respect to the secondary outflow stream direction at the trailing edge of the fin.

12. The intermediate housing of claim 11, wherein the angle is equal to 5°.

13. The intermediate housing of claim 1, wherein a deviation angle between an inlet and an outlet of each of the two ducts is comprised between 70° and 90°.

14. The intermediate housing of claim 1, wherein the fin has an azimuth range comprised between 30° and 50°.

15. The intermediate housing of claim 14, wherein the azimuth range is of 40°.

16. A turbomachine comprising an intermediate housing according to claim 1.

* * * * *